US009535988B2

(12) United States Patent
Horowitz et al.

(10) Patent No.: US 9,535,988 B2
(45) Date of Patent: Jan. 3, 2017

(54) BLOG-BASED VIDEO SUMMARIZATION

(75) Inventors: Steven Horowitz, Oakland, CA (US);
Marc Davis, San Francisco, CA (US);
Malcolm Slaney, Sunnyvale, CA (US)

(73) Assignee: Yahoo! Inc., Sunnyvale, CA (US)

( * ) Notice: Subject to any disclaimer, the term of this patent is extended or adjusted under 35 U.S.C. 154(b) by 2049 days.

(21) Appl. No.: 11/963,450

(22) Filed: Dec. 21, 2007

(65) Prior Publication Data
US 2009/0164904 A1  Jun. 25, 2009

(51) Int. Cl.
*G06F 17/30* (2006.01)
*G11B 27/034* (2006.01)

(52) U.S. Cl.
CPC ... *G06F 17/30817* (2013.01); *G06F 17/30843* (2013.01); *G11B 27/034* (2013.01)

(58) Field of Classification Search
USPC ........ 715/716, 723, 201, 203, 863; 707/711; 700/693
See application file for complete search history.

(56) References Cited

U.S. PATENT DOCUMENTS

| 7,319,806 | B1 * | 1/2008 | Willner et al. | 386/248 |
| 7,624,416 | B1 * | 11/2009 | Vandermolen et al. | 725/109 |
| 2002/0054083 | A1 * | 5/2002 | Boreczky | G06F 3/0481 715/738 |
| 2004/0095377 | A1 * | 5/2004 | Salandro | G11B 27/034 715/723 |
| 2004/0221323 | A1 | 11/2004 | Watt | |
| 2006/0282776 | A1 * | 12/2006 | Farmer | G11B 27/34 715/719 |
| 2007/0245243 | A1 * | 10/2007 | Lanza et al. | 715/723 |
| 2008/0052630 | A1 * | 2/2008 | Rosenbaum et al. | 715/738 |
| 2008/0172615 | A1 * | 7/2008 | Igelman et al. | 715/719 |
| 2008/0301734 | A1 * | 12/2008 | Goldeen et al. | 715/810 |
| 2009/0013252 | A1 * | 1/2009 | DeWitt | 715/716 |
| 2011/0167462 | A1 * | 7/2011 | O'Connor et al. | 725/110 |

FOREIGN PATENT DOCUMENTS

| WO | WO 2007135688 | * | 5/2007 |
| WO | WO 2008024516 | * | 8/2007 |

OTHER PUBLICATIONS

R. Schroeter, J. Hunter, and D. Kosovic. "FilmEd—Collaborative Video Indexing, Annotation and Discussion Tools Over Broadband Networks" Proceedings of the Multimedia Modelling Conference 2004. Brisbane, Australia. Jan. 2004. pp. 346-353. doi:10.1109/MULMM.2004.1265006.

* cited by examiner

*Primary Examiner* — Stella E Higgs

(74) *Attorney, Agent, or Firm* — Martine Penilla Group, LLP

(57) ABSTRACT

Methods, apparatuses and systems directed to summarizing video or other multimedia content based on the blogging activities of one or more users. In one implementation, a user may select a video and one or more blogs that annotate various segments of the video. A user may specify one or more desired attributes of the blog or comment entries, which a system processes to create an edit decision list. The edit decision list can be used to generate a summarized version of the multimedia content that includes the content segments associated with blog entries that meet the desired attributes.

19 Claims, 8 Drawing Sheets

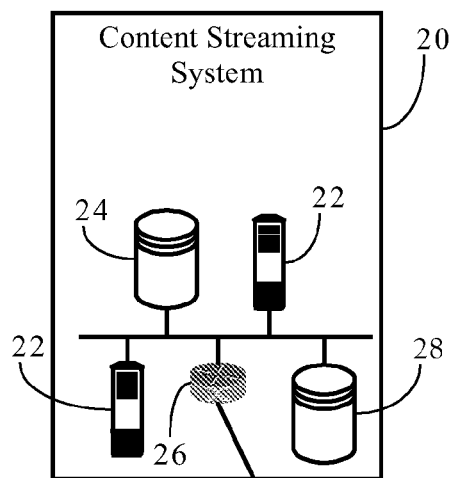
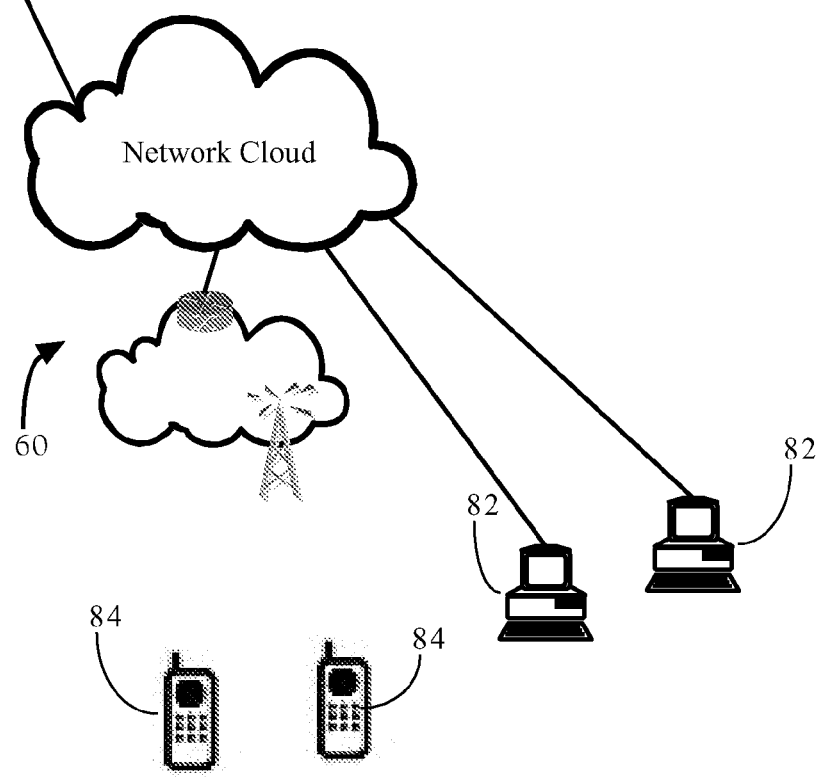
Fig._1

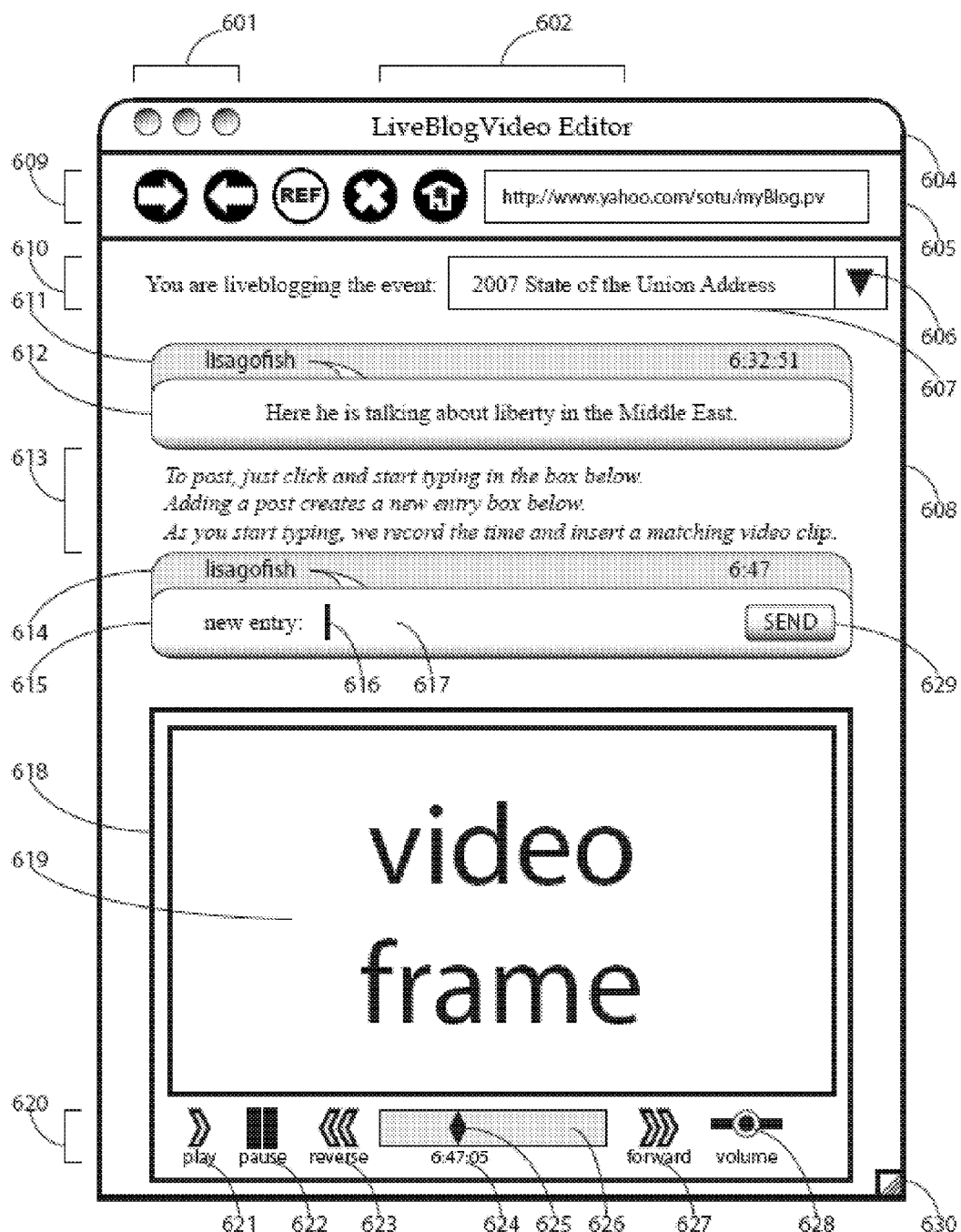
Fig._2

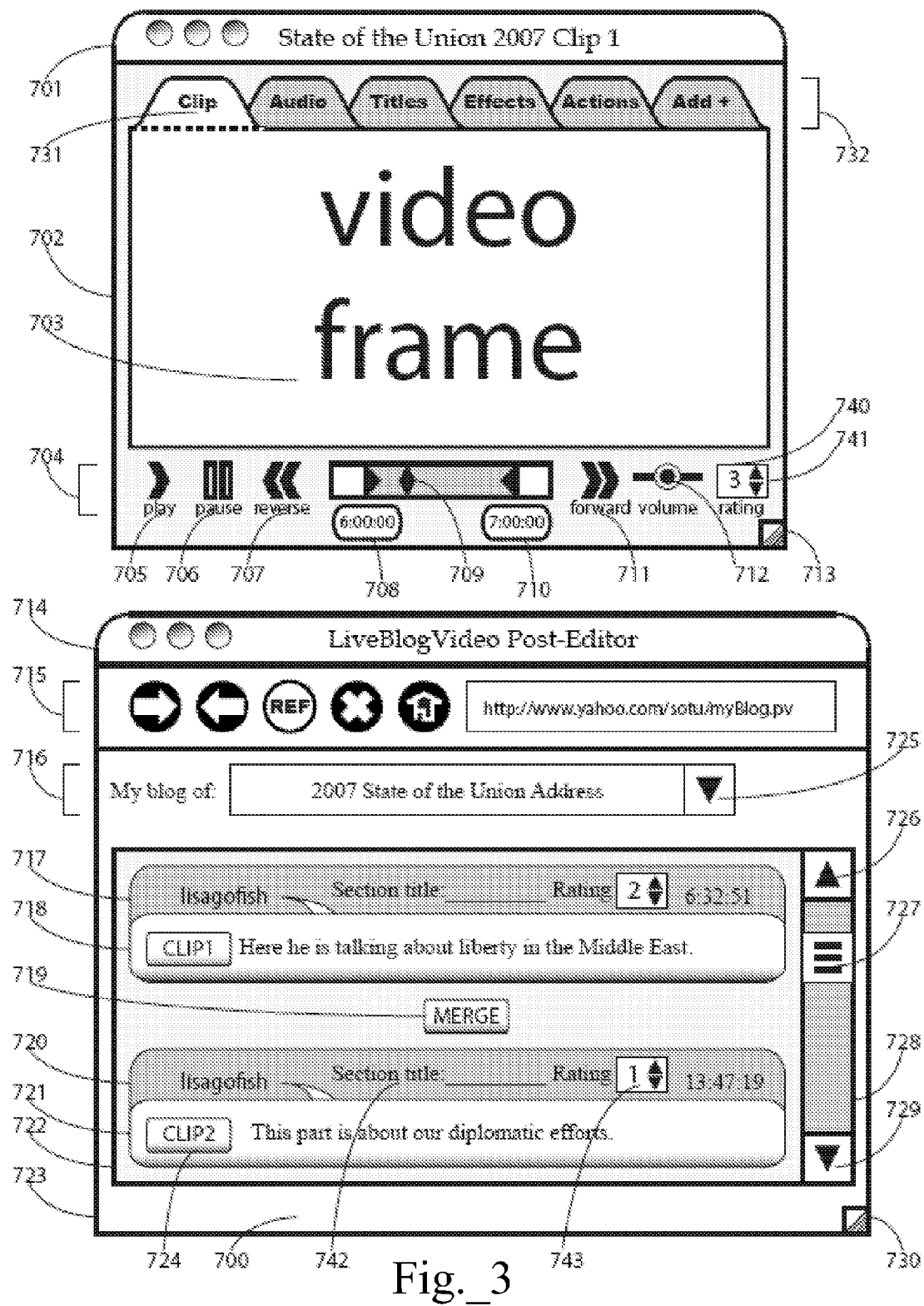
Fig._3

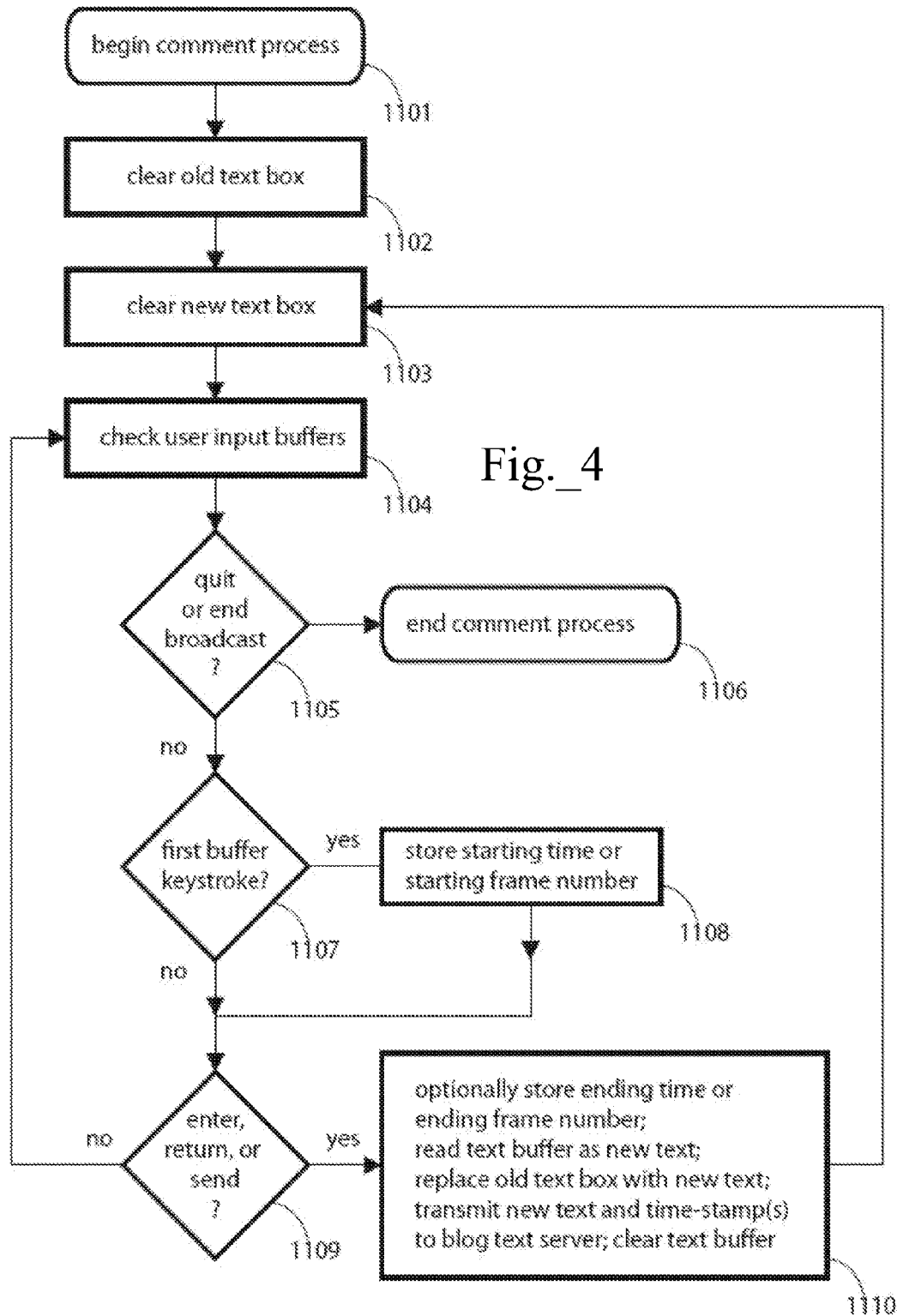
Fig._4

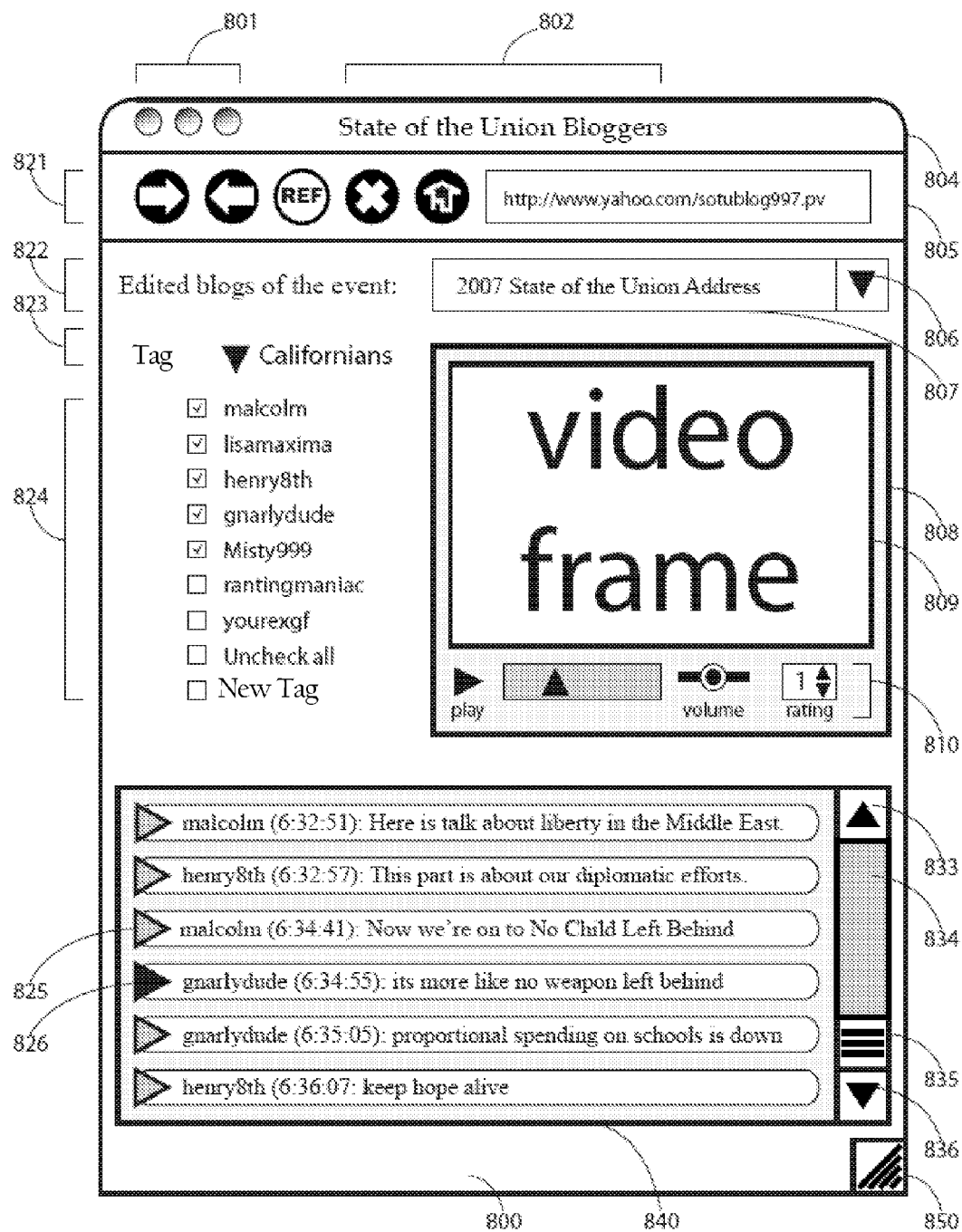
Fig._5

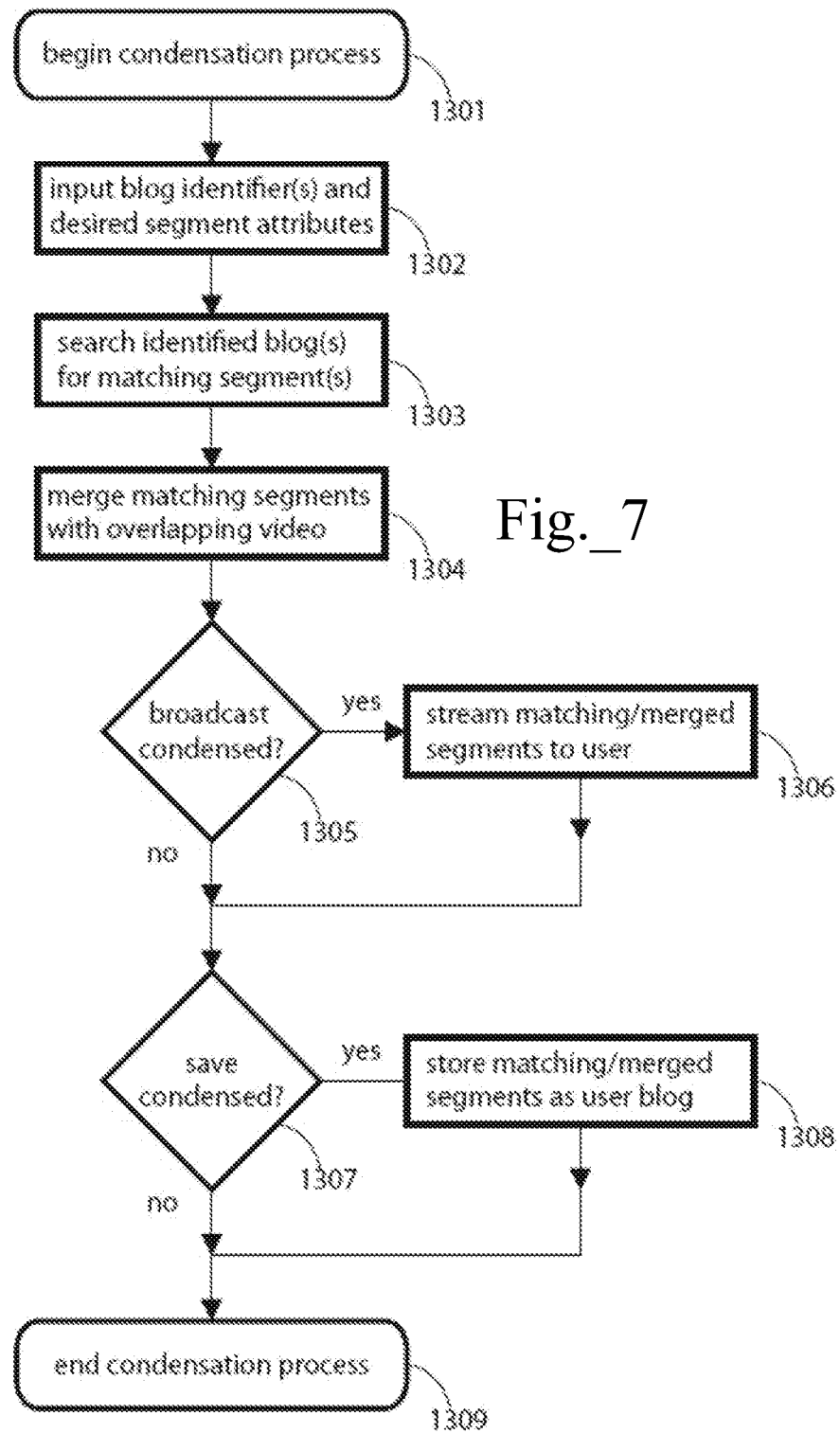
Fig._7

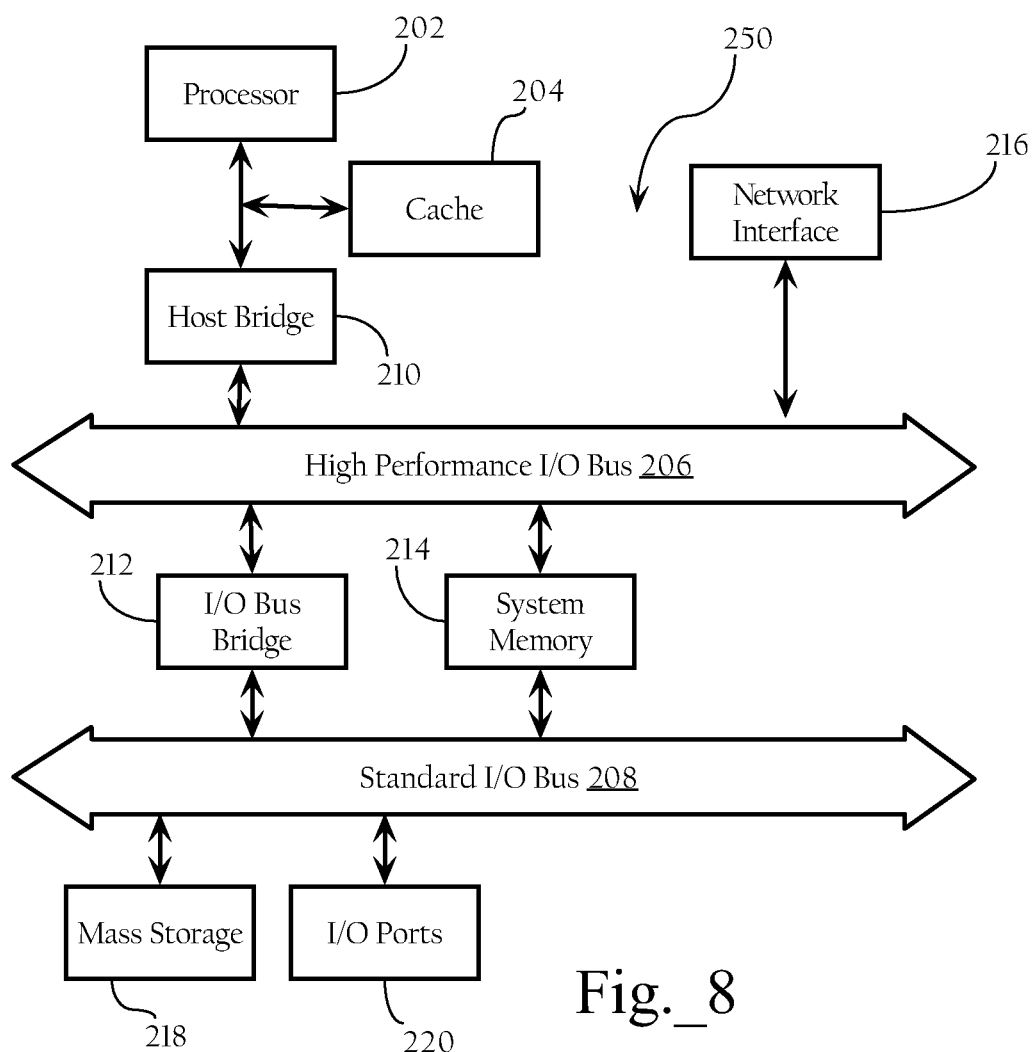
Fig._8

BLOG-BASED VIDEO SUMMARIZATION

TECHNICAL FIELD

The present disclosure relates generally to a system to create commentated videos. Users typically evaluate an audio/video broadcast and post commentary, composing network accessible logs containing commentary combined with time-aligned video clips from the broadcast. The resulting logs can be used to create summary or condensed versions of a video or other multimedia content.

BACKGROUND

Interactive systems connected by wide area networks, such as the Internet, have steadily evolved into vibrant mediums for social interaction and accessing digital media. Streaming media refers to multimedia content that is constantly received by, and normally displayed to, one or more end-users while it is being delivered by the provider. Multimedia streams can be provided live or on-demand. Some network providers host live streaming events where users may perceive streaming multimedia content, such as audio and video, and simultaneously view comments submitted by a subset of the users. These live streaming events, together with the recorded comments, can also be re-played on-demand.

In addition, a number of on-line systems have emerged that allow users to upload, share and edit multimedia content, such as YouTube®, and Yahoo!'s Jumpcut network-based video upload and editing service. In addition, collaborative video annotation systems are known. Video annotation systems, for example, allow a user to add text as metadata to a video segment. Video annotation systems can also be used to record reactions to, or descriptions of, events embodied in the video. Video annotation systems can be used, for example, to describe the football play or action corresponding to various segments of a video.

SUMMARY

The present invention provides methods, apparatuses and systems directed to summarizing video or other multimedia content based on the blogging and commenting activities of one or more users. In one implementation, a user may select a video and one or more blogs that annotate various segments of multimedia content, such as a video. A user may specify one or more desired attributes of the blog entries, which a system processes to create an edit decision list. The edit decision list can be used to generate a summarized or condensed version of the multimedia content that includes the content segments associated with blog entries that meet the desired attributes.

In a particular implementation, users comment on a video broadcast in real time, or non-real-time, using network browser applications to record text entries in a network accessible web log or "blog". A user typically accesses a service provider using a web browser to access the video broadcast and, optionally, to observe a group of peer blog entries in real time. User comments are time-stamped and stored in a personalized user blog along with pointers to related video clips from the broadcast. A user application provides video and text editing capabilities to later refine the blog, edit the selection of video clips and blog text entries, caption and add other effects to the video, and otherwise improve the blog composition. The service provider additionally facilitates consumption and/or storage of condensed highlight videos based on the blog entries.

DESCRIPTION OF THE DRAWINGS

FIG. 1 illustrates an example network environment in which particular implementations may operate.

FIGS. 2 and 3 illustrate example graphical user interfaces.

FIG. 4 is a flow chart illustrating a comment posting process.

FIGS. 5 and 6 illustrate example graphical user interfaces

FIG. 7 is a flow chart illustrating an example content editing process.

FIG. 8 sets forth an example computing system architecture.

DESCRIPTION OF PREFERRED EMBODIMENT(S)

Figure 6:
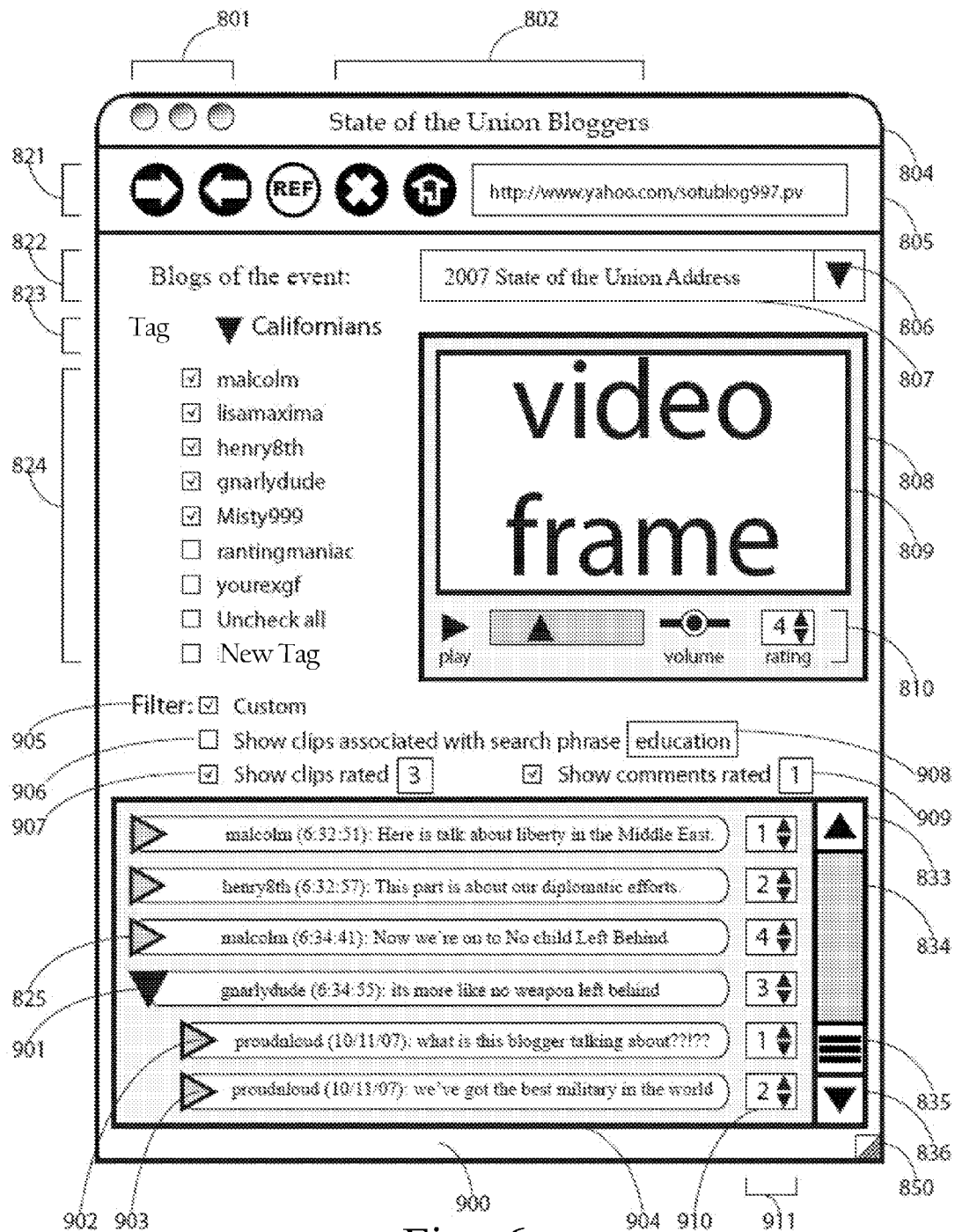

The following embodiments and aspects thereof are described and illustrated in conjunction with systems, apparatuses and methods meant to be exemplary and illustrative, not limiting in scope.

Particular implementations of the invention are directed to summarizing video or other multimedia content based on the blogging activities of one or more users. In one implementation, a user may select a video and one or more blogs that annotate various segments of the video. A user may specify one or more desired attributes of the blog or comment entries, which a system processes to create an edit decision list. The edit decision list can be used to generate a summarized version of the multimedia content that includes the content segments associated with blog entries that meet the desired attributes.

A. Network and Operating Environment

Particular implementations of the invention operate in a wide area network environment, such as the Internet, including multiple network addressable systems. Network cloud 60 generally represents one or more interconnected networks, over which the systems and hosts described herein can communicate. Network cloud 60 may include packet-based wide area networks (such as the Internet), private networks, wireless networks, satellite networks, cellular networks, paging networks, and the like.

As FIG. 1 illustrates, a particular implementation of the invention can operate in a network environment comprising content streaming system 20 and one or more client host systems 82, 84. Still further, implementations of the invention may operate in network environments that include multiples of one or more of the individual systems and sites disclosed herein. Client host systems 82, 84 are operably connected to the network environment via a network service provider or any other suitable means.

Content streaming system 20 is a network addressable system that is operative to broadcast or multicast multimedia content to one or more remote hosts. Content streaming system 20 is also operative to receive comments submitted by users of the remote hosts, and distribute the comments to the remote hosts concurrently with multimedia content.

Content streaming system 20, in one implementation, comprises one or more physical servers 22 and content data store 24. The one or more physical servers 22 are operably connected to computer network 60 via a router 26. The one or more physical servers 22 host functionality that allows users to select a live streaming event, or archived multimedia content, for display. The hosted functionality, in one implementation, also allows one or more users to add textual comments to multimedia content in real-time or offline modes. In one implementation, the functionality hosted by the one or more physical servers may include web or HTTP servers, streaming media servers, FTP servers, and the like. In a particular implementation, one or more of the servers 22 hosts a video editing application that allows users to select multimedia content that has been augmented by writer commentary, such as bloggers and editors, and generate summarized or condensed versions based on one or more attributes of the commentary.

Content data store 24 stores content as digital content data objects. A content data object or content object, in particular implementations, is an individual item of digital information typically stored or embodied in a data file or record. Content objects may take many forms, including: text (e.g., ASCII, SGML, HTML), images (e.g., jpeg, tif and gif), graphics (vector-based or bitmap), audio, video (e.g., mpeg), or other multimedia, and combinations thereof. Content object data may also include executable code objects (e.g., Java Applets, JavaScript objects, AJAX objects), and the like. Structurally, content data store 24 connotes a large class of data storage and management systems. In particular implementations, content data store 24 may be implemented by any suitable physical system including components, such as database servers, mass storage media, media library systems, and the like.

B. User Roles

There are at least two types of users of this system. A writer comments on segments of multimedia content either in real-time responding to a live streaming event, or in an offline mode. A viewer may subsequently select a given item of multimedia content from a database, and select one or more sets of comment entries that one or more writers have added to the multimedia content. As discussed below, the comment entries can be associated with a given time segment of the content. A viewer can generate a condensed version of the multimedia content by configuring a comment filter that selects the time segments having an associated comment that meets the filter. The qualifying time segments can be combined to generate a summarized version of the multimedia content. The summarized version may then be downloaded or streamed to the viewer. A person might be both a writer and a viewer, but their functions are different and are discussed separately here.

B.1. Writers

A writer creates content (typically comment text) in real-time or offline modes that relates to an event as embodied in multimedia content provided by content streaming system 20. The comments submitted by writers may be reactions to an event, a description of the event, a transcription of the audio associated with the event, an importance rating of the event, and the like. Each writer has a unique identifier that content streaming system 20 associates with them. Content streaming system 20 may also maintain metadata in connection with one or more of the writers, such as user profile data and demographic data. More elementally, content streaming system 20 maintains one or more tags or keywords for a writer. For example, the tags may describe the political leanings of a writer, such as "Liberal", "Republican", or "Democrat." Some tags may be manually configured by the writer. The system might supply additional tags based on analysis or profiling of the writer, such as location (state, city), age, and the like.

In a particular implementation, a writer initially registers with content streaming system 20 to obtain or provide a unique user identifier and, subsequently, logs in to the system when desiring to submit comments in connection with a given live multimedia streaming event, or archived event. As part of the registration process, the writer may provide tags that relate to them or their perspectives. Comments submitted by the writer, in a real-time mode, can be transmitted in discrete messages or datagrams transmitted to content streaming system 20. Browser cookies, or other suitable technologies, can be used to automatically append, to the submitted comments, the writer's identifying information and even the tags associated with the writer.

B.2. Viewers

Viewers are users that select and view multimedia content that has been augmented with comments of one or more writers provided to content streaming system 20 in connection with the underlying multimedia content. As discussed herein, viewers may configure comment filters by selecting one or more tags or other attributes relating to the comments themselves or the writers that submitted the comments. The comment filters control the selection of comments. The selection of comments, and their associated time segment information, can be used to define an edit decision list. The edit decision list can be used to generate a summarized or condensed version of the multimedia content.

In one possible embodiment, viewers may also register or log in to content streaming system 20. This allows content streaming system 20 to possibly tailor or customize the viewer's experience. For example, content streaming system 20, based on analysis of a profile or demographic information associated with the viewer, may suggest or present available comment filter configurations that may be of interest. For example, content streaming system 20 may present a "California" demographic filter to a viewer, if the content streaming system 20 detects that the viewer is a Californian or access the content streaming system 20 from a location in California. Other filter attributes can be suggested such as a "Democrat," "Republican" or "Green" comment filter configuration. Furthermore, registration and log in allows a viewer to save comment filter configurations for future use.

C. User Interfaces

The following illustrates example user interfaces that may support writer and viewer roles according to one possible implementation of the invention. The user interfaces described herein can be provided by content streaming system, and execute within the context of a client application, such as a browser client application. In such implementations, web technologies and protocols, such as HyperText MarkUp Language (HTML), JavaScript, eXtensible MarkUp Language (XML), HyperText Transport Protocol (HTTP), Real Time Transport Protocol (RTP), Real-Time Streaming Protocol (RTSP), and others, can be used to implement the functionality described herein. In other implementations, the user interfaces may be provided by a special-purpose client application.

C.1. Writer Interfaces

Writers may add comments to multimedia content in a variety of manners, utilizing a variety of tools and utilities. For example, in an offline mode, a writer may add comments to multimedia content using a blog video editor and post the blogged video to a remote site (such as content streaming system 20) for access by viewers. For example, a writer may define segments of the multimedia content using an editing tool and add comments associated with the define segment. The time coded segment information and the comments can be stored together in connection with the multimedia content or separately. Furthermore, multiple writers may edit the same multimedia content and post their commented versions to content streaming system 20, where viewers can select the multimedia content and the writers whose comments they wish to view while perceiving the multimedia content.

C.1.a. Real-Time and Streaming Comment Entry Interface

In other implementations, a writer can create comments to a live streaming event. In FIG. 2, an interface window for a writer composing comment entries while observing a video stream is shown. The interface and process flows described herein can be configured to allow a writer to comment on a live streaming event or an archived event that is also streamed from content streaming system 20. The video stream may be transmitted over the network, may be distributed by content streaming system 20, or may be distributed by cable or other transmission means. The interface window contains a window control bar 604, a browser control bar 605, and a main window area 608. The window control bar 604 contains a window title 602 and buttons 601 to close, minimize, or resize the window. The browser control bar 605 contains typical button controls for browser content in area 609, including, including from left to right, a forward button, a back button, a refresh button, a stop button, and a home button. The browser control bar 605 also includes an address or location entry area on the right where the writer can enter the URL of a website to be accessed. In the example illustrated, the writer is creating a live blog of a video broadcast accessing the website http://www.yahoo.com/sotu/myBlog.pv.

The top of window area 608 contains a control area 610 to select a video stream. In a preferred embodiment, one or more video broadcast servers publish a list of titles of audio/video broadcasts that the writer may blog. A default broadcast title is displayed in text area 607. In one implementation, a control such as black triangle 606 allows the writer to invoke a pull-down menu of available audio/video broadcasts (not shown). In such an implementation, the user clicks on the triangle, the pull-down menu appears, and the user drags the indicator through the pull-down menu list until a desired selection is reached. The selected event is displayed in updated text area 607.

A video stream for the selected video broadcast is streamed to the video player interface 618, which is embedded in window area 608 in one embodiment. In an alternate implementation, a video player interface such as that shown in area 618 is implemented in a separate window, as for example shown in FIG. 3.

A video stream for the selected video broadcast is streamed to the video player interface 618 embedded in a window area. A two-dimensional image of a title frame or a current video frame occupies the large rectangular area 619 at the top of video player interface 618. The video player interface 618 contains a control section 620 with a sequence of video player controls. In one embodiment, the sequence of video player controls includes a play button 621, a pause button 622, a reverse button 623, an elapsed time display 624-626, a forward button 627, and a volume slider 628. An icon consisting of a leftmost arrowhead denoted "play" 621 is referred to as a "play button" and used to start the video stream or to indicate that the video is playing. In one implementation, one or more user video controls are displayed in solid black to indicate that they may be active by a user click of a pointing device, whereas controls which are currently inactive are displayed in grey. By way of illustration, the controls are shown as would be typically observed during a live streaming or broadcast event.

In other implementations, pause button 622 can be used for archived events to allow the writer to pause the stream. A user taking a break from a broadcast by first invoking the pause button 622, for example, may go back in time using reverse button 623 to review portions of the video stream, go forward in time faster than real time using forward button 627 to "catch up" with the video stream, or may resume playing the video using play button 621.

As mentioned previously, elapsed time for the video stream is shown in display 624-626. A gray rectangular area 626 denotes the anticipated timeline of the video, and the relative position in time of the video frame in the video stream is indicated by the relative position of a symbol such as the black diamond 625 in the enclosed grey rectangular area 626. In one implementation of the invention, a digital time indicator 624 of the relative time of the current video frame is also or alternatively shown. In one implementation, the digital time indicated is the real time, displayed for example in one implementation as day and time in Pacific Standard Time. In a preferred implementation, the digital time indicated is the elapsed time from the beginning of the video stream as shown. A volume control slider 628 may be implemented to control the volume of an audio stream accompanying the video stream. The audio stream is typically decoded and output through a user's headphones or computer speakers (not shown). The video player implementation further operates to synchronize the audio and video streams in response to user activation of the video player controls.

An Asynchronous JavaScript and XML (AJAX) process may be invoked to provide a means for a writer to provide new comment text entries using the example interface of window areas 611-617. An instruction area 613 prompts the user with means for entering new comments. Whenever the user posts a text comment, the starting time of the text entry, as discussed below, is associated with the blog entry as a time-stamp. In the example interface, the user posted a most recent comment, "Here he is talking about liberty in the Middle East" with the time-stamp 6:32:51. The time-stamp and an identifier for the comment creator are displayed in window area 611, and the associated comment is displayed immediately underneath in window area 612. An entered comment and a video segment containing the time-stamped video frame may be automatically stored in the writer's (in this case, lisagofish's) personal blog. Still further, a second user may observe the posted entries in real time in synchronicity with the video broadcast as explained below. Still further, the posted comment may be saved with comments posted by other writers in association with the multimedia content.

The user may provide a new blog entry in window area 615, distinguished by comment divider 614. Window area 615 contains a new text entry area 617 where the user clicks and starts typing. Alternatively or additionally, a blinking cursor icon 616 indicates a current text entry cursor location and redundantly indicates a text entry area. When text is initially entered, a time-stamp is stored. As the text is entered, it appears in window area 615. When a text entry is complete, the user signals completion by typing a "return" or "enter" character on a keyboard (not shown) or by clicking on SEND button 629. The text entry becomes the most recently posted blog entry, and window areas 611, 612, and 615 are refreshed. The new time-stamp appears in window area 611, the new text entry appears in area 612, and the new text entry area 615 is cleared. In one implementation, an additional time-stamp indicating the time of completion of the text entry is stored to indicate a minimum duration of a related video clip. The start and stop times of the related video segment are approximate, especially if the comment is entered while the video is playing in real time, and can be adjusted subsequently by the writer as explained below.

As mentioned previously, writer comment entries may be automatically time-stamped and posted to content streaming system 20. Content streaming system 20, in connection with live events, can transmit the posted comments to one or more users. In addition, the posted comments and metadata can be stored in association with a writer identifier for later access by the writer and/or others. In addition, associated video clips from the commonly observed video stream are included in the user's personal blog as well. In one implementation, an approximate video clip is determined from the time-stamp and one or more attributes of the broadcast audio/video stream, as discussed below.

An example flowchart illustrating a process for a live blog commentator is shown in FIG. 4. The user is assumed to have a current comment text entry area ("new text box"), such as 617 of FIG. 2, as well as a previous comment text entry area ("old text box"). In steps 1102-1103, the new and old text boxes are cleared at the initiation of commentary. In step 1104, input buffers typically implemented to buffer keyboard entries and mouse clicks is accessed 1104 and checked in step 1105. If the commentator has completed a user action to quit the application or the broadcast has ended, the comment process is complete 1106. Otherwise, the keyboard entry buffer is checked to see if a first keyboard entry has been received. If so, the starting time (or the starting video frame) associated with the comment is stored in step 1108. In step 1109, the keyboard entry buffer is scanned until the buffer is exhausted or an "enter" or "return" character is found. If an enter or return character is found, or the user has clicked on the "send" button 629, the comment is complete and the flowchart proceeds to step 1110. Otherwise, the comment is still being composed and the flowchart returns to step 1104 to await further input to complete a comment. When the comment is complete, 1109 proceeds to 1110, where the ending time of the comment is optionally stored, the text input buffer up to comment completion is transferred as a new text comment, the old text box is replaced with the new text comment, the new text comment and time-stamp(s) are transmitted to content streaming system 20, and the used portion of the text buffer is cleared. The flowchart proceeds to step 1103 to clear the new text box and await new comments. The content streaming system 20 can be configured to log the blog entries submitted by multiple users in connection with time information. This logged information can be used to select those segments of the video or other multimedia content. As mentioned previously, the process described above may be implemented using semi-autonomous AJAX processes executing within the context of a browser client application. As discussed below, the comments posted by the writer can be later modified and editing using a post-editing interface.

In one example implementation, the broadcast video stream is partitioned into relevant portions (video clips or segments) as commonly conceived by the viewing public. The partitioning may be performed automatically or manually. Automatic partitioning may be implemented by detecting changes in video scenery, certain audio sounds, metadata embedding in the video stream, images embedded in the video stream, and/or video program breaks. For example, if the video stream is a broadcast football game, the video stream may be partitioned into clips corresponding to football plays, or if the video stream is a political speech, the video may be partitioned into clips dealing with particular topics, or may be partitioned using audio analytics into clips separated by audio portions of applause. The stream partitioning may occur automatically, or may be performed manually by an employee-editor of the content streaming system 20. The time duration of each video clip constituting the video stream is determined, and an appropriate video clip containing the user's time-stamp is linked with the user's personal blog in a background process.

In an alternate embodiment, the broadcast audio/video stream is automatically partitioned into a plurality of equal time segments. For example, in one implementation a default video clip associated with a time-stamped blog text entry may consist of an adjustable time segment during which the text entry was made, for example by automatically saving a video clip including the previous n seconds of video and the following n seconds of video, where n may be assigned a default value or may be adjusted as a user preference. In another implementation, a video broadcast may be parsed into video clips by automatically detecting one or more attributes of the audio/video broadcast. In a political speech, for example, sub-topics may be separated by detectable applause in the audio stream. Alternatively, facial recognition techniques allow analysis of a video stream to determine when a person is speaking. Still further, video segments can be identified based on analysis of a closed-caption data feed.

C.1.b. Time Synchronization of Comments

As mentioned previously, one application for the embodied invention allows an observer to access a plurality of users sharing blog comments in real time or later in an archived replay of the multimedia content with the commentary. In such an application, effective sharing and reconstruction of shared comments requires that the various sharing users are time-synchronized. Time-synchronization may be accomplished by various means.

In one example implementation, user comments are synchronized using real-time time-stamps. In one embodiment, the video stream server transmits a real-time time reference at the initiation of the video stream. The implemented client code receives the time reference and compares it to a local time reference, computing a time-offset. Thereafter, the time-offset may be added to a current value of a local time reference at the beginning of text entry to create a time-stamp to transmit with the text entry to the blog text server. In an alternative embodiment, the time-offset is transmitted to the blog text server to be included as metadata in the user's personal blog. The user transmits the current value of the local time reference with a blog text entry to the blog text server, which adds the previously received time-offset to the local time reference to create a time-stamp associated with the blog text entry. In addition, if the broadcast event is a commercial video broadcast, for example, the broadcast may occur at different times in differing time zones or from differing stations. In one implementation, the implemented client code further identifies the local time zone and broadcast time.

In an alternate embodiment, user comments are time-synchronized by using information from the rendered audio/video stream. An audio/video stream may be transmitted to a blog composer and rendered using a first software process, by for example, using a first AJAX process to render an RTSP stream. The video rendering process further provides an elapsed time count or an elapsed video frame count available to a second software process, such as an AJAX process used to monitor user blog entries. When the user begins or completes a textual blog entry as discussed above, the second process may associate an elapsed time or an elapsed frame count with the text entry as a time-stamp. The time-stamped comment text entry is transmitted to the content streaming system with the submitted post.

An advantage of the elapsed video time-stamp embodiment is that it allows a post-synchronization of various users who are not time-synchronized or who become misaligned in real time. For example, a first user receiving a video broadcast of a political speech, for example, may decide to pause the video broadcast and take a break. The first user returns and may resume observing a delayed video broadcast and comment in non-real time. Other users may continue to view the rendered video in nearly real-time, but may experience differing broadcast times or communication path time delays. Their comments and the comments of the first user may be post-aligned with other users at a blog text server using time references based on elapsed time of viewing the rendered video.

C.1.c. Post-Editing Interface

FIG. 3 illustrates an interface for post-editing the saved blog text entries and video clips, shown for illustrations purposes only and not by way of limitation, as two windows. A first window contains a video player interface with video editing tools, while a second window contains a blog text entry display interface with text editing tools. Alternatively, a video display/editing area and a text display/editing area may be combined in a single window. As known by those of skill in the art, these and other embodiments or arrangements of the elements of the invention may be used to provide an interface suitable for comment and comment text editing capabilities to refine one or more blog compositions. The user can use the interface to modify comment text and modify time segment information associated with the text. The writer may then post the blogged version of the multimedia content for access by viewers.

In FIG. 3, a top window 702 for video display and editing is shown with window title bar 701, with for example buttons to close, minimize, or resize the window and titled "State of the Union 2007 Clip 1". Window title bar 701 contains various window button controls as discussed previously. A bottom window 723 for blog text display and text editing is shown with window title bar 714, for example titled with "LiveBlog Video Post-Editor". In this embodiment, the bottom window 723 is used primarily for editing the blog as a whole and blog text by combining, adding, deleting, or editing comments, and the top window is used as a supporting video editor. The top window is used to adjust timing of the video segment. The interface represents one example partitioning of blog editing functions between the two windows, and other partitioning schemes are possible.

The top window 702 contains a video player similar to that shown in FIG. 2, with a large rectangular area 703 for rendering video frames and various controls 704 to control the video player, including a play, pause and reverse button 705-707, a video time-line display 709 with digital start-time display 708 and digital end-time display 710, forward control 711 and volume control 712. Digital start-time display 708 is directly below an associated right-pointing arrowhead, symbolizing the start-time of the video clip in a time line represented by a gray bar. Similarly, digital end-time display 710 is directly below an associated left-pointing arrowhead, symbolizing the end-time of the video clip.

The bottom window 723 contains a title bar 714, a typical browser control bar 715, as explained with regard to browser control bar 609, and a main window area 700. The main window area 700 has a title section 716 with a control 725 to select a particular blog subject from a plurality of subjects, as explained with regard to broadcast selector/display 606-607. The blog for the particular subject is displayed in a scrollable entry area 722. The scrolling mechanism is provided by an up arrow 726, a slider 727, a time-line display 728 and a down arrow 729. The relative position of the slider 727 in the time-line display 728 gives the current approximate time location in a time line of user commentary. A user wishing to display earlier blog text entries clicks on up arrow 726 or clicks/drags slider 727 upward. Similarly, a user wishing to display later blog text entries clicks on down-arrow 729 or clicks/drags slider 727 downward.

A typical blog text entry is shown in comment area 717-718. A comment area, such as 717, includes a separated area 718 and may include one or more of a time-stamp for the comment, a title area, an identifier for the commentator, the text of the comment, an identifier or link to an associated video clip, such as shown in example "CLIP2" button 724. In one implementation of the invention, a user clicking on a video link or clip button, such as 724 or the "CLIP1" button in 718, initiates a display of the associated video clip in the top video display area 703, and updates the associated time display indicators for the video clip 708-710. The user may edit the text of the comment using familiar text-editing menu (not shown) commands, such as copy, cut, paste, and delete, or may edit text by clicking and typing at an insertion cursor. The comment area 718 automatically expands to hold the user's comment. In one implementation, a user may also merge two or more comments into a single comment, using for example, a MERGE button 719. When the MERGE button 719 is clicked, the blog entry above and below are combined into a single comment containing text of both the comments, and the two associated video clips are merged into a single video clip whose duration contains the two original video clips. Alternatively, the editing functionality described herein can be used to split a video segment into two segments, and to include or split comments entries for each of the video segments.

A user may further edit the associated video clip using the video editor area 702. The nominal start and end times of the video clip may be assigned, automatically, by default, or manually as explained below. When a video clip is loaded into the video editor window 702, the user may assign a new video start-time or end-time, in one implementation, by manually editing the digital time indicator, clicking on the time indicated and typing in a new value. In an alternate or redundant implementation, the user may assign a new video start-time or end-time by clicking and dragging the associated start-time or end-time arrowhead leftward for an earlier time or rightward for a later time. Alternatively, controls to adjust the duration of the video clip may be provided directly in the blog editor. As shown, the default function of the video editor is to review and adjust video clip starting and stopping times. A plurality of additional video editing functions may be implemented and combined in one window as shown in example tabbed window interface 731-732. As shown, a default function to adjust a "Clip" is illustrated by the highlighted function tab "Clip" 731 in a plurality of function tabs.

For example, a user may add visual displays or video overlays to the video stream in one implementation. In a preferred embodiment, a user may add a video title frame indicating the title of a video clip at the beginning of the clip.

The title and/or other video effects may be invoked through activation of one or more pull-down menu items (not shown), may be invoked through a blog text editor window, or additional user interface controls may be displayed in video frame area 703. As shown, the separator for a blog entry area such as 717 contains an optional section title. A user who clicks in the title area and types in text automatically adds a title frame to the associated video clip in one implementation. Alternatively, the user clicks on the "Titles" tab of tab area 732, resulting in a highlighting of the background of the Titles tab and a darkening of the "Clip" tab 731. The user selects from a menu including a "Section Title Frame" (not shown) and composes text in the title frame using text editing and formatting tools (not shown).

In a further embodiment, the comment composer can rate various comments and video clips as to relevance or priority. Rating area 743, for example, allows the user to rate the comment in section 720-721 on an example scale of one to five. Ratings can be based on any suitable normalized range or scale. Similarly, rating area 740 allows the user to rate a currently observed video clip. As shown, the user has rated the comment as a "1" and the clip as a "3." The user may change the rating for example by highlighting and typing in a new value in the rating area, or may use example adjustment controls/buttons, such as example up/down arrowheads shown in area 741. To increase (or decrease) the rating of the video clip, the user clicks on the up (or down) arrow. When the user completes editing of the blog, comment and video clip ratings are transmitted to the blog ratings server 213, which tracks ratings from consumers as well as composers of blogs.

D. Multimedia Content Summarization

However, comments are added or posted, the resulting metadata associated with a given item of multimedia comment includes one or more comment entries submitted by one or more writers. Each comment entry identifies a writer, includes comment text, and includes information that identifies or points to a given time segment of the multimedia content. The commenting activity of one or more writers, and the other data stored with it, can be leveraged to condense or summarize a given item of multimedia content in a variety of manners. For example, a viewer may choose a given item of multimedia content and select a single writer whose comments, and the time segments associated with them, form the basis for condensing the multimedia content. In other implementations, a viewer can select a given item of multimedia content and configure a comment filter that includes all (or a subset of) writers that submitted comments.

D.1. Interface for Initially Viewing Content

In FIG. 5, an example interface window for a user consuming comment entries while observing related video clips is shown. The example interface of FIG. 5 may be used for consumers of live blogs, archived blogs or consumers of post-edited blogs of one or more selected writers. The interface window contains a window control bar 804, a browser control bar 805, and a main window area 800. The window control bar contains a window title 802 "State of the Union Bloggers" and buttons 801 to close, minimize, or resize the window. The browser control bar 805 contains typical browser button controls and a URL entry area 821.

Main window area 800 contains broadcast selection area 822 with broadcast title area 807 and selection control 806. The video stream for the video broadcast is rendered in window area 808, and contains a stream of video frames including a current video frame 809 and a subset of example video player controls 810, as explained above.

To the left of the video player interface, title area 823 indicates that a group of writers corresponding to the tag "Californians" is posting (or has posted) blog entries for the video broadcast. In one implementation, the title area has a proximate control, represented by the black triangle of area 823, to expand the list of writers corresponding to a given tag 824. Each participant in the list has an indicator icon consisting of a box next to a user identifier. In one implementation, a box with a check mark indicates an activated user. In the user list 824, the first five users are activated, while the remaining four users are not. In a preferred embodiment, the users are sorted and activated users appear at the top of the list.

In blog text history area 840, the blog entries from the activated users are posted by default. In one implementation, the blog entries can be further filtered in a second filtering process for relevance to the user and a subset of the blog entries is posted in the window. The selected text entries appear in history area 840. Each blog entry appears with a user identifier, a time-stamp for the entry, and the text of the entry. When the recent blog entries exceed the capacity of the window area 840, a scrollable history may be implemented, such as by using slider controls 833-836. A user clicking on up 833 or down 836 arrow returns to previous or later blog entries. The user may alternatively click and drag slider 835 to traverse the history of blog entries represented by grey area 834. The user may also resize the interface window by dragging corner slider 850.

In FIG. 6, an expanded interface window for a user consuming threaded blog entries while observing a video is shown. The interface combines the elements of FIG. 5 with a modified text history area 904 and additional controls 905-909. The expanded interface allows a second user to read and post threaded entries to a first user's personal blog while observing the first user's blog entries and other threaded blog entries. The threaded comment interface is invoked by clicking and activating a control such as 826 of FIG. 5. In response, the control may alter appearance as shown in example rotated triangle 901, and the area directly beneath the associated comment is replaced with threaded comments, as for example, threaded comments with starting symbols 902-903. Additional treaded comments may be added by clicking on any grey comment indicator, such as 825 or 902-903. When such an indicator is activated, the area directly underneath expands to reveal a text entry area, which is not shown but is similar to text entry area 615-617.

Completed comments are contained as additional threads in the first user's personal blog. The threaded comments can also be used as additional filter criteria when generating condensed versions of the multimedia content. For example, a viewer can configure a filter that searches for content segments having greater than a threshold number of threaded comments.

D.2. Condensing Multimedia Content Based on Comments

A further embodiment of the invention is explained with reference to FIG. 6. A user observing one or more blogs may desire to view a condensed version of the multimedia content. To this end, the user may desire to filter the comments of one or more selected bloggers to view only those video segments or clips that include embedded comments with certain desired attributes, such as tags or keywords. Controls 905-909 in FIG. 6 provide a user interface to implement this filtering. Control 905 heads the filtering area of the interface. The user may select any of the filtering options by checking a selection box. As shown, a "Custom" filter and two example default filters have been selected. When a user selects a custom filter, a dialog box (not shown) with various filter options appears, and the user can combine various attribute parameters. A second filtering option 906 is a default filter which allows selection of comments related to a user-selected search phrase. The search phrase (in this case, "education") is entered in text box 908. A third filtering option 907 is a default filter which allows selection of video clips with a minimum average user rating of 3. Another option is a filter based on the identity of the writers. Another option allows filtering of comments with low ratings. The ratings may be based on composer ratings, as determined for example by averaging composer ratings such as that shown in FIG. 3, Ref. No. 743, may be based on average consumer ratings, or may be based on a weighted combination of composer/consumer ratings. A means to collect consumer ratings is shown in 910-911. Each in a sequence of rating areas 911 is proximately associated with a comment. The consuming user may adjust the rating of comment 903, for example, by adjusting the value in ratings area 910. When the user is done consuming, the updated ratings are transmitted to the blog ratings server 213. Yet another filter attribute can be the frequency of user access or views of different blog entries. Other filters attributes can be based on the number of blog entries across multiple blogs with which a given video or content segment is associated. In one implementation, for example, a filter can be configured to identify segments of a video stream where the rate of blog entries submitted in connection with a real-time video or audio broadcast exceeded a threshold rate. Other user-interface designs and database queries known to those skilled in the art can be implemented to filter the comment data by text, as well as writer age, gender and other demographic and psychographic parameters singly or in combination.

FIG. 7 shows an example flowchart for a multimedia condensation process. A consumer desiring a sequence of video segments from one or more video blog identifies the one or more blogs and desired segment attributes in a request to the content streaming system 20. In step 1302, request parameters are input to a condensation process. The process searches for video segments with matching video attributes (if any), while the blog text server searches for text comments with matching textual attributes (if any). For example, the consumer may prefer to view all video segments with a consensus rating of 3 or more. The matching segments are input to step 1304 to handle any overlapping segments. If two segments overlap in time, they are merged into a single segment. The matching time segment information can be used to generate an edit decision list that can be used as an input to a content editing system that generates the edited output. In step 1305, the nature of the request is checked. If the consumer desires to receive the condensed/merged segments, they are streamed to the user in step 1306. The nature of the request is further checked in step 1307. If the consumer desires to save the condensed/merged segments, they are stored as a user blog in step 1308, and the condensation process terminates in step 1309. Other delivery methods are possible, such as downloading the edited content object.

The foregoing allows a viewer to create edited versions of multimedia content based on the original version. In addition, the systems disclosed herein allow viewers to create edited versions of multimedia content that are themselves blogged or edited versions of the original multimedia content. In each case, the edited versions can be configured to include the video segments matching the filters configured by a user, and can also be configured to display a select set of comments of one or more writers (either as a closed-caption display, or as a block of text below or overlaying the video).

E. Example Computing System Architectures

While the methods and systems of the present invention have been described above with reference to specific embodiments, some or all of the elements or operations thereof may be implemented using a computer system having a general purpose hardware architecture. FIG. 8 illustrates an example computing system architecture, which may be used to implement the above described embodiments, which may be used to perform one or more of the processes or elements described herein. In one embodiment, hardware system 200 comprises a processor 202, a cache memory 204, and one or more software applications and drivers directed to the functions described herein. Additionally, hardware system 200 includes a high performance input/output (I/O) bus 206 and a standard I/O bus 208. A host bridge 210 couples processor 202 to high performance I/O bus 206, whereas I/O bus bridge 212 couples the two buses 206 and 208 to each other. A system memory 214 and a network/communication interface 216 couple to bus 206. Hardware system 200 may further include video memory (not shown) and a display device coupled to the video memory. Mass storage 218, and I/O ports 220 couple to bus 208. Hardware system 200 may optionally include a keyboard and pointing device, and a display device (not shown) coupled to bus 208. Collectively, these elements are intended to represent a broad category of computer hardware systems, including but not limited to general purpose computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

The elements of hardware system 200 are described in greater detail below. In particular, network interface 216 provides communication between hardware system 200 and any of a wide range of networks, such as an Ethernet (e.g., IEEE 802.3) network, etc. Mass storage 218 provides permanent storage for the data and programming instructions to perform the above described functions implemented in the location server 22, whereas system memory 214 (e.g., DRAM) provides temporary storage for the data and programming instructions when executed by processor 202. I/O ports 220 are one or more serial and/or parallel communication ports that provide communication between additional peripheral devices, which may be coupled to hardware system 200.

Hardware system 200 may include a variety of system architectures; and various components of hardware system 200 may be rearranged. For example, cache 204 may be on-chip with processor 202. Alternatively, cache 204 and processor 202 may be packed together as a "processor module," with processor 202 being referred to as the "processor core." Furthermore, certain embodiments of the present invention may not require nor include all of the above components. For example, the peripheral devices shown coupled to standard I/O bus 208 may couple to high performance I/O bus 206. In addition, in some embodiments only a single bus may exist, with the components of hardware system 200 being coupled to the single bus. Furthermore, hardware system 200 may include additional components, such as additional processors, storage devices, or memories.

As discussed below, in one implementation, the operations of one or more of the physical servers described herein are implemented as a series of software routines run by hardware system 200. These software routines comprise a plurality or series of instructions to be executed by a processor in a hardware system, such as processor 202. Initially, the series of instructions may be stored on a storage device, such as mass storage 218. However, the series of instructions can be stored on any suitable storage medium, such as a diskette, CD-ROM, ROM, EEPROM, etc. Furthermore, the series of instructions need not be stored locally, and could be received from a remote storage device, such as a server on a network, via network/communication interface 216. The instructions are copied from the storage device, such as mass storage 218, into memory 214 and then accessed and executed by processor 202.

An operating system manages and controls the operation of hardware system 200, including the input and output of data to and from software applications (not shown). The operating system provides an interface between the software applications being executed on the system and the hardware components of the system. According to one embodiment of the present invention, the operating system is the Windows® 95/98/NT/XP operating system, available from Microsoft Corporation of Redmond, Wash. However, the present invention may be used with other suitable operating systems, such as the Apple Macintosh Operating System, available from Apple Computer Inc. of Cupertino, Calif., UNIX operating systems, LINUX operating systems, and the like. Of course, other implementations are possible. For example, the server functionalities described herein may be implemented by a plurality of server blades communicating over a backplane.

The present invention has been explained with reference to specific embodiments. For example, while embodiments of the present invention have been described as operating in connection with AJAX and HTTP, the present invention can be used in connection with any suitable protocol environment. Other embodiments will be evident to those of ordinary skill in the art. It is therefore not intended that the present invention be limited, except as indicated by the appended claims.

What is claimed is:

1. A method comprising:

receiving a plurality of comment entries entered by a plurality of users while displaying a multimedia content to the plurality of users;

partitioning the multimedia content into a plurality of multimedia segments based on the received plurality of comments, each multimedia segment being a portion of the multimedia content, the multimedia content including metadata, wherein the metadata comprises the plurality of comment entries, each comment entry including text entry data;

receiving after the partitioning a filter configuration comprising a set of filter attributes, the filter attributes defining criteria for selection of multimedia segments based on comment entries made by the plurality of users;

selecting multimedia segments having comment entries with associated metadata that matches the set of filter attributes;

receiving a user input to merge a first comment entry of a first selected multimedia segment and a second comment entry of a second selected multimedia segment;

merging the first comment entry and the second comment entry into a single merged comment entry in response to receiving the user input to merge;

merging video clips associated with the first and second selected multimedia segments into a single merged video clip in response to receiving the user input to merge; and generating an edited version of the multimedia content that includes only the merged multimedia segments edited to include the merged comment entry and the merged video clip after the user input to merge is received.

2. The method of claim 1 further comprising streaming the edited version of the multimedia content to one or more remote hosts.

3. The method of claim 1 wherein the multimedia content comprises video data.

4. The method of claim 1 wherein the set of filter attributes comprises tags corresponding to a writer that authored one or more comment entries.

5. The method of claim 1 wherein the set of filter attributes comprises a user name corresponding to a writer that authored one or more comment entries.

6. The method of claim 1 wherein the set of filter attributes comprises tags corresponding to text of a comment entry.

7. The method of claim 1, wherein the set of filter attributes includes a first filter for filtering multimedia segments based on a rating corresponding to a comment entry, wherein the multimedia segments selected have comment entries with corresponding ratings equal-to or higher-than a user-entered value.

8. The method of claim 1, wherein the set of filter attributes includes a second filter for filtering multimedia segments based on a user rating of a writer of one or more comment entries, wherein the multimedia segments selected have comment entries of writers with corresponding ratings equal-to or higher-than a user-entered value.

9. The method of claim 1, wherein the plurality of comment entries are received from the plurality of users while the multimedia content is broadcasted.

10. A computer program embedded in a non-transitory computer-readable storage medium, when executed by one or more processors, for implementing a graphical user interface, the graphical user interface comprising:

a multimedia content selection control facilitating selection of multimedia content, wherein the multimedia content selection is operable to receive a plurality of comment entries entered by a plurality of users while displaying a multimedia content to the plurality of users, wherein the multimedia content is partitioned into a plurality of multimedia segments based on the received plurality of comments, wherein the multimedia content is augmented with metadata, wherein the metadata comprises the plurality of comment entries, each comment entry including text entry data;

a filter configuration section facilitating configuration of one or more comment filter attributes, the filter attributes defining criteria for selection of multimedia segments based on comment entries made by the plurality of users, wherein a first filter using the filter attributes filters based on a corresponding rating for each comment entry;

a merge section for receiving user input to merge a first comment entry of a first selected multimedia segment and a second comment entry of a second selected multimedia segment, and merging the first comment entry and the second comment entry into a single merged comment entry, and merging video clips associated with the first and second selected multimedia segments into a single merged video clip; and a comment display section for displaying comment entries associated with the multimedia content, wherein the multimedia content selection control generates an edited version of the multimedia content that includes only the multimedia segments that match the filter attributes edited to include the merged comment entry and the merged video clip, wherein the multimedia segments selected have comment entries with corresponding ratings equal-to or higher-than a user-entered value.

11. A method comprising:

partitioning multimedia content into a plurality of multimedia segments based on content of the multimedia content, the multimedia content including metadata associated with the multimedia content, wherein the metadata comprises a plurality of comment entries, each comment entry including text entry data, wherein partitioning multimedia content further includes detecting changes in images embedded in the multimedia content, wherein each multimedia segment is bounded by changes in images;

receiving after the partitioning a filter configuration comprising a set of filter attributes, the filter attributes defining criteria for selection of multimedia segments based on comment entries made by a plurality of users, wherein a first filter using the filter attributes filters based on a corresponding rating for each writer of one or more comment entries;

selecting multimedia segments having comment entries with associated metadata that matches the set of filter attributes, wherein the multimedia segments selected have comment entries of writers with corresponding ratings equal-to or higher-than a user-entered value;

receiving a user input to merge a first comment entry of a first selected multimedia segment and a second comment entry of a second multimedia segment;

merging the first comment entry and the second comment entry into a single merged comment entry in response to receiving the user input to merge;

merging video clips associated with the first and second selected multimedia segments into a single merged video clip in response to receiving the user input to merge; and generating an edited version of the multimedia content that includes only the selected multimedia segments edited to include the merged comment entry and the merged video clip.

12. The method of claim 1, wherein partitioning multimedia content further includes detecting football plays in the multimedia content, wherein each football play is one multimedia segment.

13. The method of claim 1, wherein partitioning multimedia content further includes detecting applause in the multimedia content, wherein each multimedia segment is bounded by detected applause.

14. The method of claim 1, wherein partitioning multimedia content further includes detecting speech in the multimedia content.

15. A method performed by a computer program when executed by a processor, the method comprising:

receiving a video stream;

identifying, by the computer program, features within the video stream;

partitioning, by the computer program, the video stream into a plurality of video clips based on the identified features within the video stream;

receiving a plurality of comment entries entered by a plurality of users while the video stream was presented to the plurality of users;

receiving after the partitioning a filter configuration comprising a set of filter attributes, the filter attributes defining criteria for selection of video clips based on comment entries made by the plurality of users, wherein a first filter for filtering using the filter attributes filters based on a corresponding rating for each of the comment entries;

selecting video clips having comment entries that match the set of filter attributes, wherein the selected video clips selected have comment entries with a rating equal-to or higher-than a user-entered value; and receiving a user input to merge a first comment entry of a first selected video clip and a second comment entry of a second video clip;

merging the first comment entry and the second comment entry into a single merged comment entry in response to receiving the user input to merge;

merging video clips associated with the first and second selected video clips into a single merged video clip in response to receiving the user input to merge; and generating an edited version of the video stream that includes only the selected video clips edited to include the merged comment entry and the merged video clip.

16. The method of claim 15, wherein an identified features includes one or more of changes in video scenery, or audio sounds, or images embedded in the video stream, or program breaks, or applause.

17. The method of claim 15, wherein the plurality of comment entries is received during a broadcast of the video stream.

18. The method of claim 15, wherein the set of filter attributes comprises a user name corresponding to a writer of a comment.

19. The method of claim 15, wherein the set of filter attributes comprises a user rating corresponding to a writer.

* * * * *